United States Patent
Polychroniadou et al.

(10) Patent No.: US 12,100,044 B2
(45) Date of Patent: *Sep. 24, 2024

(54) DIFFERENTIAL PRIVACY FOR AXE OBFUSCATION

(71) Applicant: JPMorgan Chase Bank, N.A., New York, NY (US)

(72) Inventors: Antigoni Ourania Polychroniadou, New York, NY (US); Tucker Richard Balch, Suwanee, GA (US); Gabriele Cipriani, London (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/138,462

(22) Filed: Apr. 24, 2023

(65) Prior Publication Data

US 2023/0260027 A1 Aug. 17, 2023

Related U.S. Application Data

(63) Continuation of application No. 17/380,821, filed on Jul. 20, 2021, now Pat. No. 11,669,903.

(30) Foreign Application Priority Data

Jul. 20, 2020 (GR) .............................. 20200100425

(51) Int. Cl.
*G06Q 40/04* (2012.01)
*G06F 21/62* (2013.01)
*G06Q 20/38* (2012.01)

(52) U.S. Cl.
CPC ............. *G06Q 40/04* (2013.01); *G06F 21/62* (2013.01); *G06Q 20/383* (2013.01)

(58) Field of Classification Search
CPC ..................................................... G06Q 40/04
(Continued)

(56) References Cited

U.S. PATENT DOCUMENTS

2003/0055692 A1 3/2003 Menninger
2010/0063877 A1 3/2010 Soroca et al.
(Continued)

FOREIGN PATENT DOCUMENTS

CN 110941856 3/2020

OTHER PUBLICATIONS

Extended European Search Report dated Jul. 2, 2024 issued in European Patent Application No. 21846563.1-1206.

*Primary Examiner* — Robert R Niquette
(74) *Attorney, Agent, or Firm* — GREENBLUM & BERNSTEIN, P.L.C.

(57) ABSTRACT

A method and a system for using differential privacy techniques to provide axe obfuscation with respect to information included in an inventory axe list of available securities is provided. The method includes: obtaining first information to be included in a first inventory axe list to be published on a particular day; retrieving second information included in a second inventory axe list that was published on the previous day and/or several previous days; obfuscating the obtained first information by applying an algorithm based on the difference between the first information and the second information; and publishing the first inventory axe list by transmitting the obfuscated first information to a plurality of intended recipients. The quality of obfuscation may be measured and controlled as a function of desired privacy level and potential cost.

17 Claims, 4 Drawing Sheets

(58) Field of Classification Search
USPC .................................................. 705/35–45
See application file for complete search history.

(56) References Cited

U.S. PATENT DOCUMENTS

| | | |
|---|---|---|
| 2013/0223673 A1 | 8/2013 | Davis et al. |
| 2015/0134504 A1* | 5/2015 | Ryden .................... G06Q 40/04 |
| | | 705/37 |
| 2017/0249491 A1 | 8/2017 | MacIntosh et al. |
| 2019/0166100 A1 | 5/2019 | Park et al. |

* cited by examiner

DIFFERENTIAL PRIVACY FOR AXE OBFUSCATION

CROSS-REFERENCE TO RELATED APPLICATIONS

This application is a continuation of U.S. patent application Ser. No. 17/380,821, filed Jul. 20, 2021, which claims priority from Greek Patent Application No. 20200100425, filed in the Greek Patent Office on Jul. 20, 2020. The disclosure of each of these documents, including the specification, drawings, and claims, is incorporated herein by reference in its entirety.

BACKGROUND

1. Field of the Disclosure

This technology generally relates to methods and systems for preserving privacy with respect to sensitive information, and more particularly, to methods and systems for using differential privacy techniques to provide axe obfuscation.

2. Background Information

An axe is an interest in a particular security that a firm is looking to buy or sell. In general, the firm providing that axe would prefer to keep the information private, because it provides an indication of the direction they may want to trade a particular security. If other market participants are informed of how a particular firm is axed in a given security, they can in essence offer the security at an unfavorable price or drive the price of the security in a more disadvantageous direction before the firm can transact. As a result, firms typically keep their axes secret.

When a bank finds two clients that are interested in the same security but with opposite direction (i.e., one client is interested to buy and the other is interested to sell), then the bank can offer the two clients to trade internally and without impacting the market price adversely to either client. However, if the bank cannot find two matching clients, then the bank has to perform the trade in the public market, which introduces some additional cost and might impact the price. Banks therefore put efforts in locating internalized matches.

One such effort is the following: In order to incentivize clients to trade, a bank may publish a list of securities that the bank is interested in trading. This axe list provides clients the ability to locate available trades at reduced financing rates and as a result, increased trading activity and better internalization may be achieved. In order to construct this list, the publishing bank aggregates internal firm inventory along with risk inventory resulting from facilitating client trades. However, this is somewhat unsatisfactory, because the bank reveals its inventory and effectively leaks its own axe. In addition, the contributing clients to the list may feel that their traded activity has been at least partially revealed to other clients, even though the list is anonymized and includes aggregated information.

SUMMARY

The present disclosure, through one or more of its various aspects, embodiments, and/or specific features or sub-components, provides, inter alia, various systems, servers, devices, methods, media, programs, and platforms for using differential privacy techniques to provide axe obfuscation.

According to an aspect of the present disclosure, a method for preserving privacy with respect to information is provided. The method is implemented by at least one processor. The method includes: obtaining first information to be included in a first inventory axe list of available securities; obfuscating the obtained first information by applying an algorithm to the first information; and publishing the first inventory axe list by transmitting the obfuscated first information to a plurality of intended recipients. The first information to be included in the first inventory axe list includes an identification of a first security, a number of shares of the first security that are available to be bought, an identification of a second security, and a number of shares of the second security for which an offer to buy is available.

The method may further include retrieving second information included in a second inventory axe list that has previously been published. The obfuscating may include applying the algorithm to a difference between the first information and the second information.

A publication date for the second inventory axe list may be one day prior to a publication date for the first inventory axe list. The list is generally published every day.

The method may further include measuring a quality of obfuscation with respect to the obfuscated first information.

The measuring of the quality of the obfuscation may include calculating a probability of correctly guessing a client activity direction that indicates an identification of an entity that has conducted a transaction with respect to at least one from among the first security and the second security based on a difference between the published first inventory axe list and the published second inventory axe list.

The measuring of the quality of the obfuscation may include calculating a cost incurred as a result of the obfuscating.

The applying of the algorithm may include: expressing the difference between the first information and the second information as a summation of a time-sequenced set of changes; adding, to each of the changes, a respective perturbation value; and calculating the obfuscated first information based on a result of the adding.

Each respective perturbation value may be calculated by using a Laplace mechanism as a function of a global sensitivity parameter and a privacy budget parameter.

According to another exemplary embodiment, a computing apparatus for preserving privacy with respect to information is provided. The computing apparatus includes a processor, a memory, and a communication interface coupled to each of the processor and the memory. The processor is configured to: obtain, via the communication interface, first information to be included in a first inventory axe list of available securities; obfuscate the obtained first information by applying an algorithm to the first information; and publish the first inventory axe list by transmitting, via the communication interface, the obfuscated first information to a plurality of intended recipients. The first information to be included in the first inventory axe list includes an identification of a first security, a number of shares of the first security that are available to be bought, an identification of a second security, and a number of shares of the second security for which an offer to buy is available.

The processor may be further configured to: retrieve, from the memory, second information included in a second inventory axe list that has previously been published; and obfuscate the first information by applying the algorithm to a difference between the first information and the second information.

A publication date for the second inventory axe list may be one day prior to a publication date for the first inventory axe list.

The processor may be further configured to measure a quality of obfuscation with respect to the obfuscated first information.

The processor may be further configured to measure the quality of the obfuscation by calculating a probability of correctly guessing a client activity direction that indicates an identification of an entity that has conducted a transaction with respect to at least one from among the first security and the second security based on a difference between the published first inventory axe list and the published second inventory axe list.

The processor may be further configured to measure of the quality of the obfuscation by calculating a cost incurred as a result of the obfuscating.

The processor may be further configured to apply the algorithm by: expressing the difference between the first information and the second information as a summation of a time-sequenced set of changes; adding, to each of the changes, a respective perturbation value; and calculating the obfuscated first information based on a result of the adding.

Each respective perturbation value may be calculated by using a Laplace mechanism as a function of a global sensitivity parameter and a privacy budget parameter.

According to yet another aspect of the present disclosure, a non-transitory computer readable storage medium storing instructions for preserving privacy with respect to information is provided. The storage medium includes executable code which, when executed by at least one processor, causes the at least one processor to: obtain first information to be included in a first inventory axe list of available securities; obfuscate the obtained first information by applying an algorithm to the first information; and publish the first inventory axe list by transmitting the obfuscated first information to a plurality of intended recipients. The first information to be included in the first inventory axe list includes an identification of a first security, a number of shares of the first security that are available to be bought, an identification of a second security, and a number of shares of the second security for which an offer to buy is available.

When executed by the at least one processor, the executable code may further cause the at least one processor to: retrieve second information included in a second inventory axe list that has previously been published; and obfuscate the first information by applying the algorithm to a difference between the first information and the second information.

A publication date for the second inventory axe list may be one day prior to a publication date for the first inventory axe list.

When executed by the at least one processor, the executable code may further cause the at least one processor to measure a quality of obfuscation with respect to the obfuscated first information.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
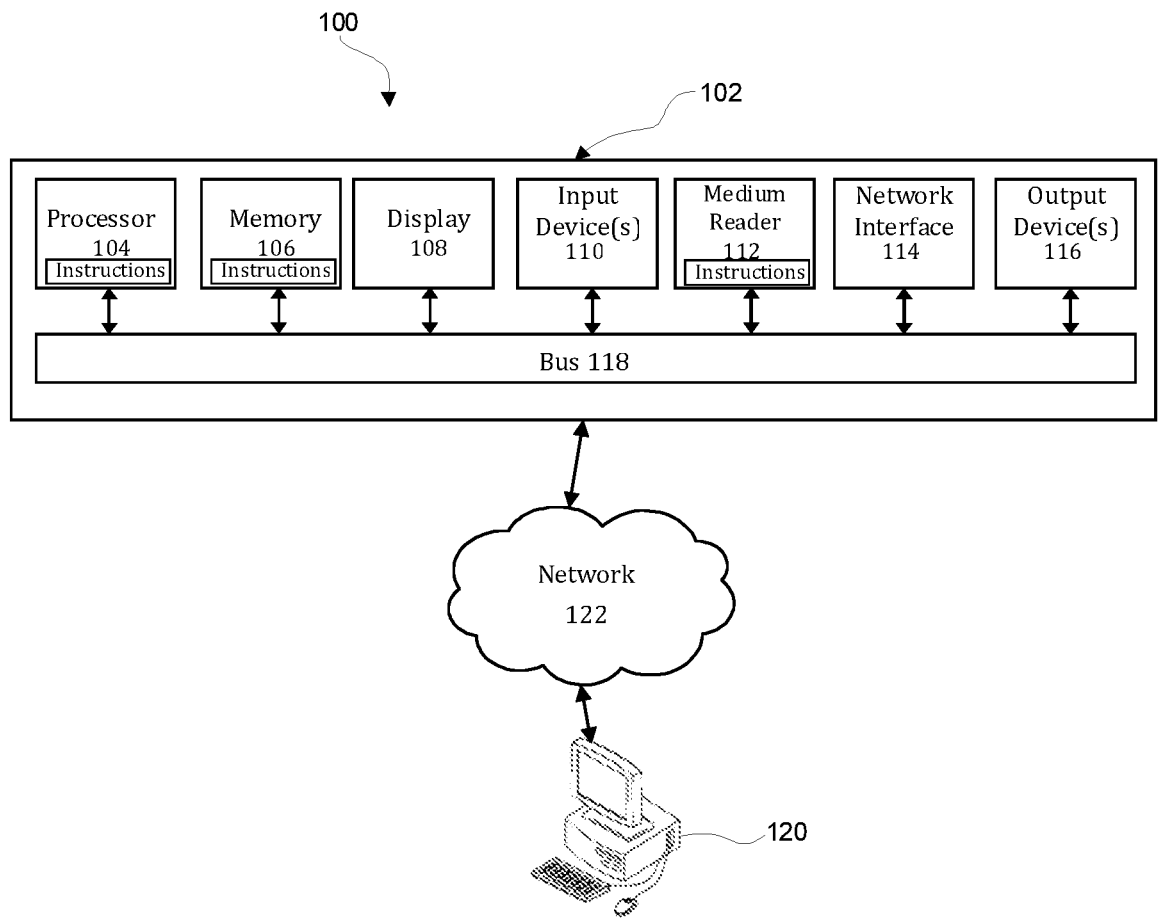
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized methods and systems for using a differential privacy technique to provide axe obfuscation.

Figure 2:
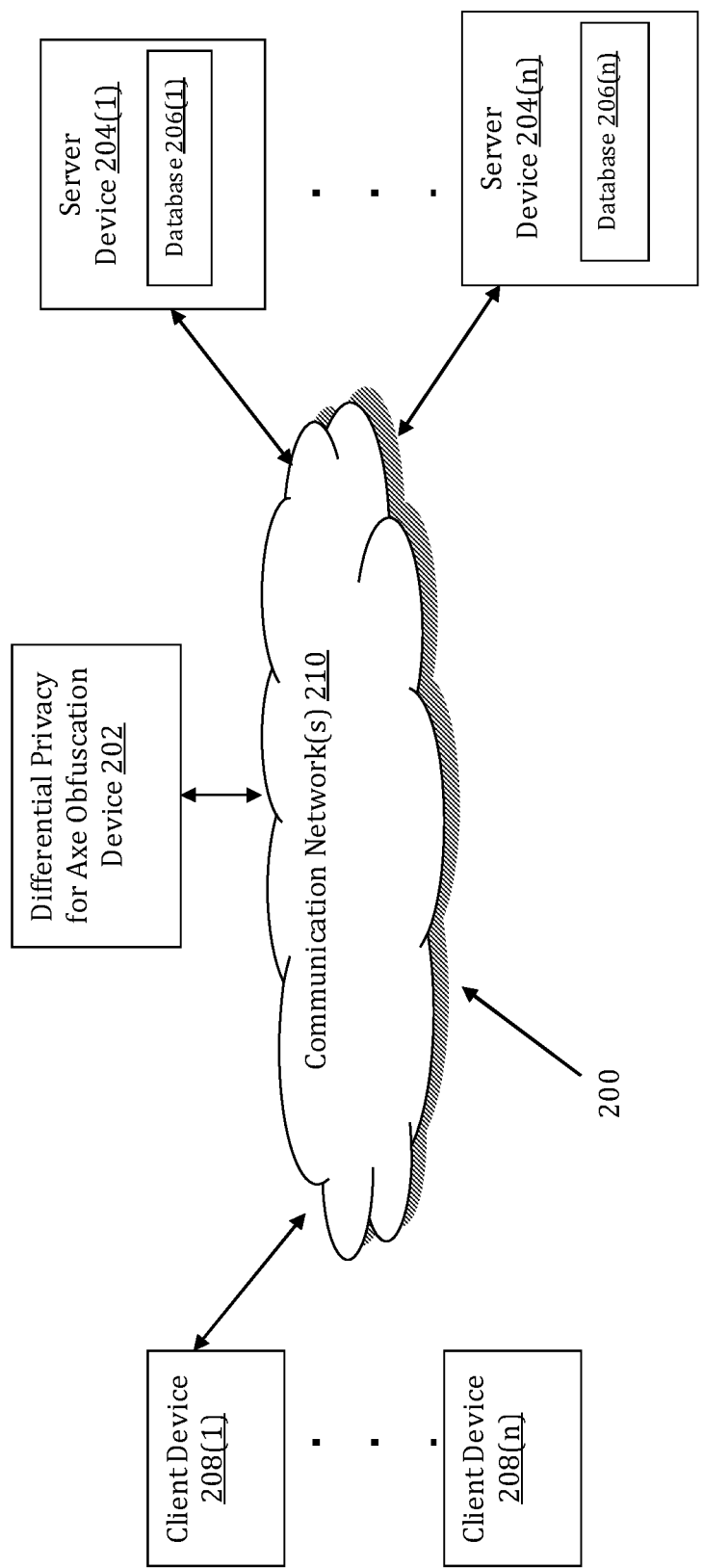
FIG. 2 illustrates an exemplary diagram of a network environment.

Referring to FIG. 2, a schematic of an exemplary network environment 200 for implementing a method for using a differential privacy technique to provide axe obfuscation is illustrated. In an exemplary embodiment, the method is executable on any networked computer platform, such as, for example, a personal computer (PC).

The method for using a differential privacy technique to provide axe obfuscation may be implemented by a Differential Privacy for Axe Obfuscation (DPAO) device 202. The DPAO device 202 may be the same or similar to the computer system 102 as described with respect to FIG. 1. The DPAO device 202 may store one or more applications that can include executable instructions that, when executed by the DPAO device 202, cause the DPAO device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the DPAO device 202 itself, may be located in virtual server(s) running in a cloud-based computing environment rather than being tied to one or more specific physical network computing devices. Also, the application(s) may be running in one or more virtual machines (VMs) executing on the DPAO device 202. Additionally, in one or more embodiments of this technology, virtual machine(s) running on the DPAO device 202 may be managed or supervised by a hypervisor.

In the network environment 200 of FIG. 2, the DPAO device 202 is coupled to a plurality of server devices 204(1)-204(n) that hosts a plurality of databases 206(1)-206(n), and also to a plurality of client devices 208(1)-208(n) via communication network(s) 210. A communication interface of the DPAO device 202, such as the network interface 114 of the computer system 102 of FIG. 1, operatively couples and communicates between the DPAO device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the DPAO device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and DPAO devices that efficiently implement a method for using a differential privacy technique to provide axe obfuscation.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The DPAO device 202 may be a standalone device or integrated with one or more other devices or apparatuses, such as one or more of the server devices 204(1)-204(n), for example. In one particular example, the DPAO device 202 may include or be hosted by one of the server devices 204(1)-204(n), and other arrangements are also possible. Moreover, one or more of the devices of the DPAO device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the DPAO device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) host the databases 206(1)-206(n) that are configured to store historical trading activity data and axe list data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the DPAO device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the DPAO device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the DPAO device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the DPAO device 202, the server devices 204(1)-204(n), or the client devices 208(1)-208(n), for example, may be configured to operate as virtual instances on the same physical machine. In other words, one or more of the DPAO device 202, the server devices 204(1)-204(n), or the client devices 208(1)-208(n) may operate on the same physical device rather than as separate devices communicating through communication network(s) 210. Additionally, there may be more or fewer DPAO devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
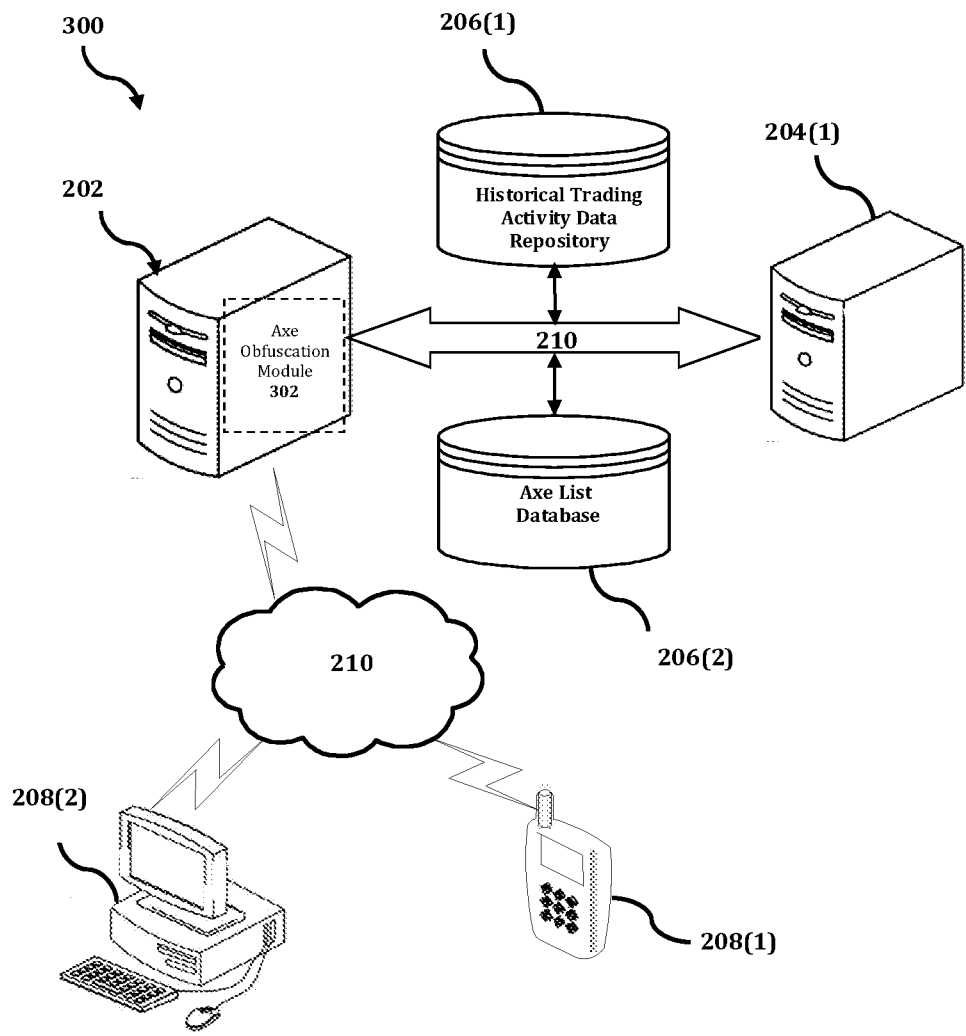
FIG. 3 shows an exemplary system for implementing a method for using a differential privacy technique to provide axe obfuscation.

The DPAO device 202 is described and shown in FIG. 3 as including an axe obfuscation module 302, although it may include other rules, policies, modules, databases, or applications, for example. As will be described below, the axe obfuscation module 302 is configured to implement a method for using a differential privacy technique to provide axe obfuscation in an automated, efficient, scalable, and reliable manner.

An exemplary process 300 for implementing a method for using a differential privacy technique to provide axe obfuscation by utilizing the network environment of FIG. 2 is shown as being executed in FIG. 3. Specifically, a first client device 208(1) and a second client device 208(2) are illustrated as being in communication with DPAO device 202. In this regard, the first client device 208(1) and the second client device 208(2) may be "clients" of the DPAO device 202 and are described herein as such. Nevertheless, it is to be known and understood that the first client device 208(1) and/or the second client device 208(2) need not necessarily be "clients" of the DPAO device 202, or any entity described in association therewith herein. Any additional or alternative relationship may exist between either or both of the first client device 208(1) and the second client device 208(2) and the DPAO device 202, or no relationship may exist.

Further, DPAO device 202 is illustrated as being able to access a historical trading activity data repository 206(1) and an axe list database 206(2). The axe obfuscation module 302 may be configured to access these databases for implementing a method for using a differential privacy technique to provide axe obfuscation.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the DPAO device 202 via broadband or cellular communication. Of course, these embodiments are merely exemplary and are not limiting or exhaustive.

Upon being started, the axe obfuscation module 302 executes a process to using a differential privacy technique to provide axe obfuscation. An exemplary process using a differential privacy technique to provide axe obfuscation is generally indicated at flowchart 400 in FIG. 4.

Figure 4:
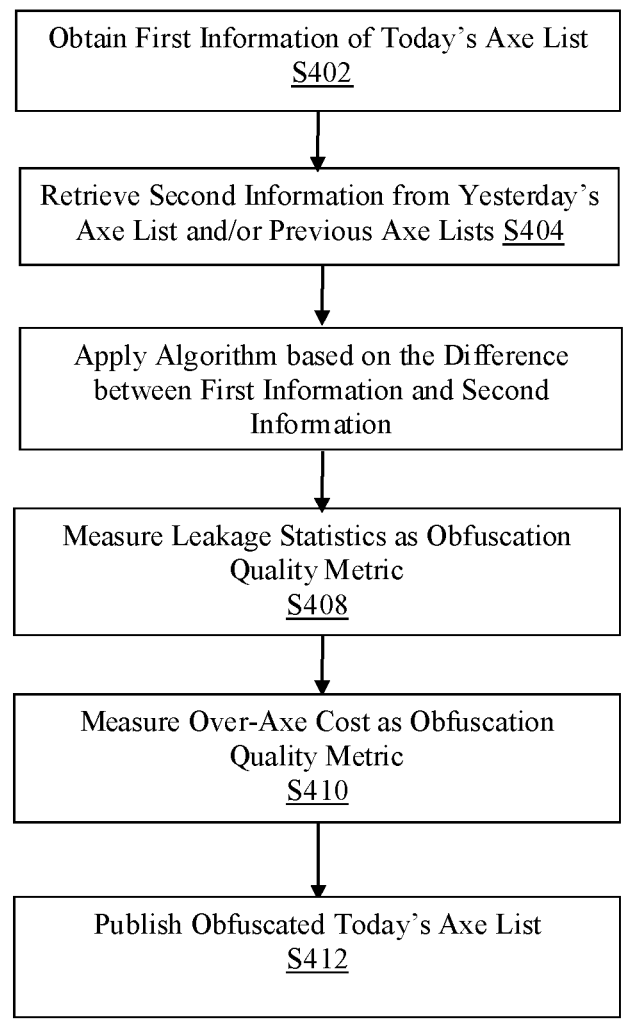
FIG. 4 is a flowchart of an exemplary process for implementing a method for using a differential privacy technique to provide axe obfuscation.

In the process 400 of FIG. 4, at step S402, the axe obfuscation module 302 obtains first information regarding an axe list to be published. The first information includes identifying information regarding securities that are available to be bought and/or sold, and numbers of shares that are available to be bought and/or sold. In an exemplary embodiment, the axe list is published on a daily basis, and so the axe list to be published is today's axe list.

At step S404, the axe obfuscation module 302 retrieves second information from a most recent previous axe list, such as, for example, yesterday's axe list. In an exemplary embodiment, the second information is obtained from a memory, such as, for example, axe list database 206(2).

At step S406, the axe obfuscation module 302 determines a difference between the obtained first information and the retrieved second information, and then applies an obfuscation algorithm to the as-determined difference. In an exemplary embodiment, the difference is calculated to calculate a global sensitivity, and a noise/perturbation value is applied on today's axe list based on the new global sensitivity. In this manner, the difference between the two sets of information is obfuscated.

At step S408, the axe obfuscation module 302 measures leakage statistics as a first metric of a quality of the obfuscation. In an exemplary embodiment, the leakage statistics may be measured by calculating a probability of correctly guessing a client activity direction that indicates an identification of an entity that has conducted a transaction with respect to at least one from among the first security and the second security based on the difference between the published first inventory axe list and the published second inventory axe list.

At step S410, the axe obfuscation module 302 calculates a cost incurred as a result of the obfuscating. In particular, there is a tradeoff between an amount of obfuscation and an amount of cost with respect to profit and loss (i.e., P&L cost). In an exemplary embodiment, the calculation of the incurred cost may be performed by determining an over-axe frequency, which is a rate at which the as-published axe list is beyond what can be accommodated by the true, unobfuscated information from which the obfuscated axe list is derived.

At step S412, the current axe list is published by transmitting the list of available securities and the numbers of shares thereof that are available to be purchased or sold to a predetermined group of intended recipients. Noise may be added to the current axe list before it is published.

In an exemplary embodiment, a privacy preserving algorithm that generates a noisy axe list while protecting client privacy and maintaining a desired profit-and-loss level uses a differential privacy technique by which carefully computed mathematical noise is added to the axe list. The noise term is designed to be large enough to mask individual client positions and small enough to achieve the desired profit-and-loss level. The following description includes several mathematical expressions that use variables defined as shown below in Table 1:

TABLE 1

| | |
|---|---|
| x(t) | B/S positions |
| a(t), $a_{PUB}$(t) | Published Axe |
| $a_{TRUE}$(t) = −x(t) | True Axe |
| $a_{HIST}$(t) | Historical Axe |
| $a_{PRE}$(t) | True Axe at the start the trading day |
| $a_{POST}$(t) | True Axe at the end of the trading day |
| $a_{HIT}$(t) | Hit Axe |
| p(t) | Client's positions |
| h(t) | Indicator function flagging when Axe is hit |
| P(t) | Stock prices |
| $r_F$(t) | Funding spreads |
| $r_B$(t) | Borrowing spreads |
| $r_A$(t) | Axe spreads |
| L | Indicator function flagging when Axe is hit |
| $\alpha_L$(t) = $Lr_B$(t) − $r_F$(t) | Daily return for long positions |
| $\alpha_S$(t) = $r_B$(t) | Daily return for short positions |
| $PL_{BASE}$(t) | (t) Daily Non-Axed P&L |
| $PL_{AXE}$(t) | Daily Axed P&L |
| $\Delta PL$(t) = $PL_{AXE}$(t) − $PL_{BASE}$(t) | Differential daily P&L generated by the Axe |

TABLE 1-continued

| | |
|---|---|
| σ | Axe Normal volatility |
| W(t) | Brownian Motion |
| $\tau_{MAX}$ | Maximum Sampling Time used for Differential Privacy obfuscation |
| $\Delta PL_{MAX}$(t) | Optimal daily P&L, i.e. when Published and True Axes are the same |
| ∈ | Privacy Budget for Differential Privacy obfuscation |

Axe Simulation

To analyze the quality of various Axe obfuscation strategies with respect to both profit-and-loss (P&L) and information leakage, a Monte Carlo Axe simulation is implemented. The engine mimics the following sequence of actions on each daily time-step:

True Axe is calculated at start of day

Obfuscation Strategy is applied to the True Axe and Published Axe is presented to clients Some of the Published Axe is hit by clients, hence changing the True Axe by the end of the day, as well as the accrued P&L The approach is to use the Historical Axe as the base of the simulations, and then keep into account the effect of new/simulated Axe Trades. To do that, the following Axe quantities are introduced:

$\alpha_{HIST}$(t): Historical Axe, not simulated $\alpha_{PRE}$(t): True Axe at the start the trading day, keeps into account both the Historical Axe as well as Axe Trades hit up to the previous date $\alpha_{POST}$(t): True Axe at the end of the trading day, keeps into account both the Historical Axe as well as Axe Trades hit up to the current date $\alpha_{PUB}$(t): Published Axe $\alpha_{HIT}$(t): Hit Axe The Monte Carlo stepping is then implemented as follows:

$$a_{PRE}(t) = a_{HIST}(t) - \sum_{t' \in [t-\Theta, t)} a_{HIT}(t')$$

$$a_{PUB}(t) = F(a_{PRE}(t))$$

$$a_{HIT}(t) = h(t)a_{PUB}(t)$$

$$a_{POST}(t) = a_{HIST}(t) - \sum_{t' \in [t-\Theta, t]} a_{HIT}(t') = a_{PRE}(t) - a_{HIT}(t)$$

where:

Θ is the Axe Holding Period, a constant parameter

F( ) is a shortcut for the chosen obfuscation strategy

P&L Metric

The daily hedging P&L when no Axe is published is:

$$\frac{PL_{BASE}(t)}{P(t)} = \alpha_L(t)x(t)\theta(x(t)) + \alpha_S(t)x(t)(1 - \theta(x(t)))$$

$$= \alpha_L(t)x(t)\frac{1 + \text{sgn}(x(t))}{2} + \alpha_S(t)x(t)\frac{1 - \text{sgn}(c(t))}{2}$$

where:

$\alpha_L$(t)=$Lr_B$(t)−$r_F$(t)

$\alpha_S$(t)=$r_B$(t)

This means that:

When the position is Long, the funding rate must be paid, and a fraction of the borrow rate may be received because of internalization.

When the position is Short, the borrow rate must be paid.
From this point forward, it is assumed that L=0.

When the Axe is published and hit with probability h(t), the P&L is instead given by:

$$\frac{PL_{AXE}(t)}{P(t)} = \alpha_L(t)(x(t) + h(t)\alpha(t))\theta(x(t) + h(t)\alpha(t)) + \alpha_S(t)(x(t) +$$

$$h(t)\alpha(t))(1 - \theta(x(t))) + r_A(t)h(t)\alpha(t)$$

$$= \alpha_L(t)(x(t) + h(t)\alpha(t))\frac{1 + \text{sgn}(x(t) + h(t)\alpha(t))}{2} +$$

$$\alpha_S(t)(x(t) + h(t)\alpha(t))\frac{1 - \text{sgn}(x(t) + h(t)\alpha(t))}{2} +$$

$$r_A(t)h(t)\alpha(t)$$

The differential P&L is then:

$$\frac{\Delta PL(t)}{P(t)} = \left[r_A(t) + \frac{\alpha_L(t) + \alpha_S(t)}{2}\right]h(t)\alpha(t) +$$

$$\frac{\alpha_L(t) - \alpha_S(t)}{2}[(x(t) + h(t)\alpha(t))\text{sgn}(x(t) + h(t)\alpha(t)) - x(t)\text{sgn}(x(t))]$$

In the following we always discard the Axe Spread P&L and set $r_A(t)=0$.

A simpler way to look at the P&L above is as follows. Introducing the True Axe, $a_{TRUE}(t)=-x(t)$, we can express the differential P&L as follows:

$$\Delta PL(a_{TRUE}(t),a(t))=PL(h(t)a(t)-a_{TRUE}(t))-PL(-a_{TRUE}(t))$$

where PL(x(t)) is the hedge P&L as a function of the positions:

$$PL(x(t)) = \left[\frac{\alpha_L(t) + \alpha_S(t)}{2} + \frac{\alpha_L(t) - \alpha_S(t)}{2}\text{sgn}(x(t))\right]x(t)P(t)$$

The best P&L is achieved when $h(t)a(t)=a_{TRUE}(t)$, with a maximum equal to:

$$\Delta PL^{MAX}=-PL(-a_{TRUE}(t))$$

Please notice that $\Delta PL^{MAX} \to 0$ when $a_{TRUE}(t) \to 0$, obvious point but has an impact on the re-sampling strategy discussed later.

Obfuscation Metrics

Below are the metrics used to measure the quality of obfuscation. In all cases, information leakage of the Client's trading activity is analyzed, as trying to obfuscate the direction of client positions is much more difficult and would defeat the idea of publishing an Axe.

Leakage Statistics

The term "Leakage Statistics" is defined herein as the probability of correctly guessing the Client Activity direction using the direction of change of the Published Axe, i.e.:

$$L:=Pb[\Delta p(t)<0,\Delta a_{PUB}(t)>0]+Pb[\Delta p(t)>0,\Delta a_{PUB}(t)<0]$$

Over-Axe Frequency and Worst Case Cost

The Over-Axe Frequency is defined herein as the rate at which the Published Axe is beyond what can be accommodated by the True Axe.

Defining the Over-Axe Quantity as:

$$Q^{OA}(t) := \begin{cases} \frac{\max\left(0, a_{PUB}(t) - a_{TRUE}(t)\left[1 + \frac{r_B(t)}{r_F(t)}\right]\right)}{\max(0, -a_{PUB}(t))} & \text{if } a_{TRUE}(t) \geq 0 \\ \frac{\max\left(0, -a_{PUB}(t) + a_{TRUE}(t)\left[1 + \frac{r_F(t)}{r_B(t)}\right]\right)}{\max(0, a_{PUB}(t))} & \text{if } a_{TRUE}(t) < 0 \end{cases}$$

the Over-Axe Frequency is given by:

$$F^{OA}(t):=Pb[Q^{OA}(t)>0]$$

The Over-Axe Worst Case Cost may also be measured. This is defined herein as the cost incurred if the Axe is fully hit every time the Over-Axe Quantity is different from zero (and not hit at all otherwise). It is a very conservative measure of the P&L loss due to over-axing:

$$C^{OA}(t) := E\left[\begin{cases} Q^{OA}(t)r_B(t) & \text{if } a_{TRUE}(t) \geq 0 \\ Q^{OA}(t)r_F(t) & \text{if } a_{TRUE}(t) < 0 \end{cases}\right]$$

Differential Privacy

Suppose there is a database D={R1 ... Rn} and a statistics q(D) to be obfuscated. The objective is to release a different, obfuscated statistics A(D) which is as close as possible to q(D) while guaranteeing that an external observer cannot infer whether a single record has been removed from database D.

Hence the following is a definition of an ε-Differentially Private Aggregation algorithm:

A randomized statistics A(D) is ε-Differentially Private if, for any neighboring databases $D_1$, $D_2$, that differ by one single record and for any possible randomized data set $\tilde{D}$, the following expression is valid:

$$e^{-\varepsilon} \leq \frac{Pb[A(D_1) = \tilde{D}]}{Pb[A(D_2) = \tilde{D}]} \leq e^{\varepsilon}$$

The Privacy Budget ε is a single parameter that controls the quality of obfuscation: When $-\varepsilon<<1$, there is a relatively large amount of obfuscation; and when $-\varepsilon>>1$, there is a relatively small amount of obfuscation.

This is a very powerful statement. It means that malicious observers will never be able to reconstruct information about a single record, no matter how smart a filtering algorithm is used.

In the context of Axe Obfuscation, a problem with this approach is that the above guarantee is valid only if the data is released only once. In particular, when statistics are released repeatedly, the effective Privacy Budget increases linearly with the number of releases. More particularly, if A(D) is ε-Private, releasing the statistics n times will make the overall Privacy Budget equal to nε.

Differential Privacy is a property of an obfuscation algorithm. A concrete example is based on the Laplace Mechanism. Starting from an unperturbed statistics q(D), the obfuscated statistics A(D) may be defined as follows:

$$A(D) = q(D) + \delta$$

$$\delta \sim LAP\left(\frac{GS}{\varepsilon}\right)$$

In the above expression, δ is a Laplace random variable calibrated to the data's Global Sensitivity, i.e., the largest difference between the original statistics calculated on databases differing by just one record. Using the notation above, this yields the following expression:

$$GS = \max_{D_1,D_2} \|q(D_1) - q(D_2)\|$$

Then A(D) is ε-Private.

Obfuscation with Differential Privacy

In an exemplary embodiment, a one-day period is used as the obfuscation interval for obfuscating changes of the True Axe. Given a time grid {t=0 . . . T−1}, the True Axe differences may be expressed as follows $$\sigma(t) = a_{TRUE}(t) - a_{TRUE}(t-1)$$

This expression may be divided into a positive part and a negative part, as follows:

$$\sigma^+(t) = \sigma(t) \text{ if } \sigma(t) \geq 0 \text{ else } 0$$

$$\sigma^-(t) = \sigma(t) \text{ if } \sigma(t) \leq 0 \text{ else } 0$$

A reconstruction of the True Axe may be expressed as follows:

$$a_{TRUE}(t) = a_{TRUE}(0) + \sum_{i=1}^{t} \sigma^+(i) + \sum_{i=1}^{t} \sigma^-(i)$$

Perturbations that are applied to the Axe differences may be expressed as follows:

$$\alpha^+(t) = \sigma^+(t) + \theta^+(t)$$

$$\alpha^-(t) = \sigma^-(t) + \theta^-(t)$$

where $\theta^+(t)$ and $\theta^-(t)$ are random shocks, based on the global sensitivity, to be defined below.

The Published/Obfuscated Axe may then be expressed as follows:

$$a_{PUB}(t) = a_{TRUE}(0) + \sum_{i=1}^{t} \alpha^+(i) + \sum_{i=1}^{t} \alpha^-(i)$$
$$= a_{TRUE}(t) + \Theta^+(t) + \Theta^-(t)$$

where $\Theta^+(t)$ and $\Theta^-(t)$ are cumulative shocks defined below, they are cumulative based on how many days we consider before the current time period t.

In order to obtain improved efficiency, the time grid may be divided into buckets, each long B days, as follows:

$$t = d(t)B + c(t)$$

$$c(t) = t(\bmod B)$$

$$d(t) = \frac{t - c(t)}{B}$$

Then, the cumulative shocks may be defined as follows:

$$\Theta^+(t) = \Theta^+(p(t)) + \theta^+(t) \text{ if } t(\bmod T) \neq 0 \text{ else } \rho^+(t)$$

$$\Theta^-(t) = \Theta^-(p(t)) + \theta^-(t) \text{ if } t(\bmod T) \neq 0 \text{ else } \rho^-(t)$$

where T>B is a reset period and p(t) is the start of the current B-bucket:

$$p(t) = d(t)B$$

The random shocks inside a T-period are given by sensitivities that sample the difference between maximum and minimum change of the True Axe during the current time bucket, and may be expressed as follows:

$$\theta^+(t) \sim Lap\left(\frac{\left|\max_{i \in [p(t),t]} \sigma_i^+ - \min_{i \in [p(t),t]} \sigma_i^+\right|}{\epsilon}\right)$$

$$\theta^-(t) \sim Lap\left(\frac{\left|\max_{i \in [p(t),t]} \sigma_i^- - \min_{i \in [p(t),t]} \sigma_i^-\right|}{\epsilon}\right)$$

Those at the boundary of a T-period, $\rho^+(t)$ and $\rho^-(t)$, are calculated with Laplace shocks with sensitivity equal to the Mean True Axe. Next we provide the algorithm in more detail for obfuscating the axe list ($\alpha_{TRUE}$) every day for a time period of T days. As a result, we publish every day t the obfuscated value ($\alpha_{PUB}$).

---

Algorithm 1

---

Input: Stream $a_{TRUE} \in Z$, privacy budget ε and time upper bound T
Output: At each time step t, output $a_{PUB}(t)$
Initialization: For all t ∈ [T], compute two streams $\sigma^+(t)$ and $\sigma^-(t)$ representing the true axe differences:

$$\sigma(t) = a_{TRUE}(t) - a_{TRUE}(t-1)$$
$$\sigma^+(t) = \sigma(t) \text{ if } \sigma(t) > 0 \text{ else } \sigma^+(t) = 0$$
$$\sigma^-(t) = \sigma(t) \text{ if } \sigma(t) < 0 \text{ else } \sigma^-(t) = 0$$

such that:

$$a_{TRUE}(t) = a_{TRUE}(0) + \sum_{i=1}^{t} \sigma^+(i) + \sum_{i=1}^{t} \sigma^-(i)$$

Obfuscation at time step t ∈ T: Split the time-grid T into buckets, each long B days such that t = d(t)B + c(t) where c(t) = t (mod B) and d(t) = t-c(t) / B.

If c(t) ≠ 0 perturb each value as follows:

$$\alpha^+(t) = \sigma^+(t) + \theta^+(t - c(t), t)$$
$$\alpha^-(t) = \sigma^-(t) + \theta^-(t - c(t), t)$$

where:

$$\theta^+(p(t), t) \sim Lap\left(\frac{\left|\max_{i \in [p(t),t]} \sigma_i^+ - \min_{i \in [p(t),t]} \sigma_i^+\right|}{\epsilon}\right)$$

$$\theta^-(p(t), t) \sim Lap\left(\frac{\left|\max_{i \in [p(t),t]} \sigma_i^- - \min_{i \in [p(t),t]} \sigma_i^-\right|}{\epsilon}\right)$$

For the case where c(t) = 0

$$\beta^+(d(t)) = \sum_{i=d(t)\cdot B}^{t} \sigma^+(i) + \theta^+((d(t)-1)B, t)$$

$$\beta^-(d(t)) = \sum_{i=d(t)\cdot B}^{t} \sigma^-(i) + \theta^-((d(t)-1)B, t)$$

-continued

Algorithm 1

Compute the published axe as follows:

$$a_{PUB}(t) = a_{TRUE}(0) + \sum_{i=1}^{d(t)}(\beta^+(i) + \beta^-(i)) + \sum_{i=d(t)B+1}^{t}(\alpha^+(i) + \alpha^-(i)) =$$

$$a_{TRUE}(t) + \sum_{i=1}^{d(t)}(\theta^+((i-1)B, i \cdot B) + \theta^-((i-1)B, i \cdot B)) +$$

$$\sum_{i=d(t)B+1}^{t}(\theta^+(d(t)B, i) + \theta^-(d(t)B, i))$$

The next algorithm reduces the asymptotic error of the noise to be logarithmically dependent on the time period T (log T) where T is the time period for which we keep obfuscating the axe list daily.

Algorithm 2

Input: Stream $a_{TRUE} \in Z$, privacy budget $\epsilon$ and time upper bound T
Output: At each time step t, output $a_{PUB}(t)$
Initialization: For all $t \in [T]$, compute two streams $\sigma^+(t)$ and $\sigma^-(t)$ representing the true axe differences:
$\sigma(t) = a_{TRUE}(t) - a_{TRUE}(t-1)$
$\sigma^+(t) = \sigma(t)$ if $\sigma(t) > 0$ else $\sigma^+(t) = 0$
$\sigma^-(t) = \sigma(t)$ if $\sigma(t) < 0$ else $\sigma^-(t) = 0$
such that:

$$a_{TRUE}(t) = a_{TRUE}(0) + \sum_{i=1}^{t}\sigma^+(i) + \sum_{i=1}^{t}\sigma^-(i)$$

Obfuscation at time step $t \in T$: Divide the time-grid T into log T intervals and initialize $\rho_1, \ldots, \rho_{\log T}$ to zero. Take the binary representation of t, denoted as $(t)_2$ and let $(t_i)_2$ denote the i-th bit of $(t)_2$. Let i be the least significant bit of $(t)_2$ for which $(t_i)_2 = 1$
(i.e., $i = \text{LSB}\{j : (t_j)_2 \neq 0\}$) then $$\rho_i^+ = \sum_{j<i}\rho_j^+ + \sigma^+(t)$$

$$\rho_i^- = \sum_{j<i}\rho_j^- + \sigma^-(t)$$

Perturb each value as follows:
$\alpha_i^+ = \rho_i^+ + \theta^+(t - \log T, t)$
$\alpha_i^- = \rho_i^- + \theta^-(t - \log T, t)$
where:

$$\theta^+(p(t), t) \sim Lap\left(\frac{\log T \left|\max_{i \in [p(t), t]} \sigma_i^+ - \min_{i \in [p(t), t]} \sigma_i^+\right|}{\epsilon}\right)$$

$$\theta^-(p(t), t) \sim Lap\left(\frac{\log T \left|\max_{i \in [p(t), t]} \sigma_i^- - \min_{i \in [p(t), t]} \sigma_i^-\right|}{\epsilon}\right)$$

Compute the published axe as follows:

$$a_{PUB}(t) = a_{TRUE}(0) + \sum_{j:(t_j)_2=1}(\alpha^+(j) + \alpha^-(j))$$

$$= a_{TRUE}(t) + \sum_{j:(t_j)_2=1}(\theta^+(j) + \theta^-(j))$$

The next algorithm works for an unbounded time period, with no limit for the value T.

Algorithm 3

Input: Stream $a_{TRUE} \in Z$, privacy budget $\epsilon$ and time upper bound T
Output: At each time step t, output $a_{PUB}(t)$
Initialization: Set T = 1 and for all $t \in [N]$, compute two streams $\sigma^+(t)$ and $\sigma^-(t)$ representing the true axe differences:
$\sigma(t) = a_{TRUE}(t) - a_{TRUE}(t-1)$
$\sigma^+(t) = \sigma(t)$ if $\sigma(t) > 0$ else $\sigma^+(t) = 0$
$\sigma^-(t) = \sigma(t)$ if $\sigma(t) < 0$ else $\sigma^-(t) = 0$
such that:

$$a_{TRUE_1}(t) = a_{TRUE}(0) + \sum_{i=1}^{t}\sigma^+(i) + \sum_{i=1}^{t}\sigma^-(i)$$

Obfuscation at time step $t \in T$: If $t = 2^k$ for $k \in Z$, set T = t and compute the published axe as:
$a_{PUB}(t) = a_{TRUE}(t) + (\theta^+(t - 2^{k-1}, t)$
For the case where $t \neq 2^k$ invoke Algorithm 2 with upper bound t, privacy budget $\epsilon/2$ for the streams $\sigma^-$ and $\sigma^+$ in the interval $[T + 1, t]$ with output $\sigma_{TRUE_2}(t)$. Output the published axe as:
$a_{TRUE}(t) = a_{TRUE_1}(t) + a_{TRUE_2}(t - T)$ Accordingly, with this technology, an optimized process for implementing methods and systems for using a differential privacy technique to provide axe obfuscation is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for preserving privacy with respect to information, the method being implemented by at least one processor, the method comprising:
    obtaining, via a network and as a first electromagnetic signal, first information of a first client to be included in a first list of axes, the first list of axes indicating available securities in inventory in a database storage;
    obfuscating, with differential privacy, the obtained first information by applying an algorithm to the first information to hide values included in the first information from a second client;
    adding noise to the first list of axes prior to publication;
    generating a noisy first list of axes based on the obfuscated first information and the added noise;
    repeatedly publishing, via the network and onto a centralized platform, the first list of axes by transmitting, as a second electromagnetic signal, the noisy list of axes including the obfuscated first information to a plurality of intended recipients; and
    retrieving, from the database storage, second information of a third client included in a second list of axes that has previously been published,
    wherein
        the obfuscating with the differential policy includes applying the algorithm based on a difference between the first information and the second information.

2. The method of claim 1, wherein a publication date for the second list of axes is one day prior to a publication date for the first list of axes.

3. The method of claim 1, further comprising measuring a quality of obfuscation with respect to the obfuscated first information.

4. The method of claim 3, wherein the measuring of the quality of the obfuscation comprises calculating a probability of correctly guessing a client activity direction that indicates an identification of an entity that has conducted a transaction with respect to at least one from among the first security and the second security based on a difference between the published first list of axes and the published second list of axes.

5. The method of claim 3, wherein the measuring of the quality of the obfuscation comprises calculating a cost incurred as a result of the obfuscating.

6. The method of claim 1, wherein the applying of the algorithm comprises:
    expressing the difference between the first information and the second information as a summation of a time-sequenced set of changes used to calculate a global sensitivity;
    adding, to each of the changes, a respective perturbation value based on the changes used to calculate the global sensitivity; and
    calculating the obfuscated first information based on a result of the adding.

7. The method of claim 6, wherein each respective perturbation value is calculated by using a Laplace mechanism as a function of a global sensitivity parameter and a privacy budget parameter.

8. A computing apparatus for preserving privacy with respect to information, the computing apparatus comprising:
a processor;
a memory; and
a communication interface coupled to each of the processor and the memory,
wherein the processor is configured to:
obtain, via the communication interface over a network and as first electromagnetic signal, first information of a first client to be included in a first list of axes, the first list of axes indicating available securities in inventory;
obfuscate, with differential privacy, the obtained first information by applying an algorithm to the first information to hide values included in the first information from a second client;
add noise to the first list of axes prior to publication;
generate a noisy first list of axes based on the obfuscated first information and the added noise;
repeatedly publish, via the network and onto a centralized platform, the first list of axes by transmitting, as a second electromagnetic signal and via the communication interface, the noisy list of axes including the obfuscated first information to a plurality of intended recipients; and
retrieve, from the memory, second information of a third client included in a second list of axes that has previously been published,
wherein obfuscation with the differential policy includes applying the algorithm based on a difference between the first information and the second information.

9. The computing apparatus of claim 8, wherein a publication date for the second list of axes is one day prior to a publication date for the first list of axes.

10. The computing apparatus of claim 8, wherein the processor is further configured to measure a quality of obfuscation with respect to the obfuscated first information.

11. The computing apparatus of claim 10, wherein the processor is further configured to measure the quality of the obfuscation by calculating a probability of correctly guessing a client activity direction that indicates an identification of an entity that has conducted a transaction with respect to at least one from among the first security and the second security based on a difference between the published first list of axes and the published second list of axes.

12. The computing apparatus of claim 10, wherein the processor is further configured to measure of the quality of the obfuscation by calculating a cost incurred as a result of the obfuscating.

13. The computing apparatus of claim 8, wherein the processor is further configured to apply the algorithm by:
expressing the difference between the first information and the second information as a summation of a time-sequenced set of changes used to calculate a global sensitivity;
adding, to each of the changes, a respective perturbation value based on the changes used to calculate the global sensitivity; and
calculating the obfuscated first information based on a result of the adding.

14. The computing apparatus of claim 13, wherein each respective perturbation value is calculated by using a Laplace mechanism as a function of a global sensitivity parameter and a privacy budget parameter.

15. A non-transitory computer readable storage medium storing instructions for preserving privacy with respect to information, the storage medium comprising executable code which, when executed by at least one processor, causes the at least one processor to:
obtain, via a network and as a first electromagnetic signal, first information of a first client to be included in a first list of axes, the first list of axes indicating available securities in inventory in a database storage;
obfuscate, with differential privacy, the obtained first information by applying an algorithm to the first information to hide values included in the first information from a second client;
add noise to the first list of axes prior to publication;
generate a noisy first list of axes based on the obfuscated first information and the added noise;
repeatedly publish, via the network and onto a centralized platform, the first list of axes by transmitting, as a second electromagnetic signal, the noisy list of axes including the obfuscated first information to a plurality of intended recipients; and
retrieve second information of a third client included in a second list of axes that has previously been published,
wherein obfuscation with the differential policy includes applying the algorithm based on a difference between the first information and the second information.

16. The storage medium of claim 15, wherein a publication date for the second list of axes is one day prior to a publication date for the first list of axes.

17. The storage medium of claim 15, wherein when executed by the at least one processor, the executable code further causes the at least one processor to measure a quality of obfuscation with respect to the obfuscated first information.

* * * * *